US010164699B2

(12) United States Patent
Franz et al.

(10) Patent No.: US 10,164,699 B2
(45) Date of Patent: Dec. 25, 2018

(54) CSI REPORTING IN BEAMFORMING SYSTEMS VIA TIME- AND FREQUENCY-DISTRIBUTED CSI ESTIMATION

(71) Applicant: Intel IP Corporation, Santa Clara, CA (US)

(72) Inventors: Stefan Franz, Munich (DE); Ziyang Ju, Munich (DE); Yeong-Sun Hwang, Oberhaching (DE); Ismael Gutierrez, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/392,302

(22) Filed: Dec. 28, 2016

(65) Prior Publication Data

US 2018/0183507 A1 Jun. 28, 2018

(51) Int. Cl.
*H04B 7/06* (2006.01)
*H04L 25/02* (2006.01)
(Continued)

(52) U.S. Cl.
CPC ......... *H04B 7/0626* (2013.01); *H04B 7/0452* (2013.01); *H04B 7/0632* (2013.01);
(Continued)

(58) Field of Classification Search
None
See application file for complete search history.

(56) References Cited

U.S. PATENT DOCUMENTS

2014/0044044 A1 2/2014 Josiam et al.
2014/0334564 A1* 11/2014 Singh .................. H04B 7/0413 375/267

(Continued)

FOREIGN PATENT DOCUMENTS

WO 2018125460 7/2018

OTHER PUBLICATIONS

"International Application Serial No. PCT US2017 063419, International Search Report dated Mar. 5, 2018", 3 pgs.

(Continued)

*Primary Examiner* — Yaotang Wang
(74) *Attorney, Agent, or Firm* — Schwegman Lundberg & Woessner, P.A.

(57) ABSTRACT

An apparatus of a user equipment (UE) may include memory and processing circuitry coupled to the memory. The processing circuitry may be configured to estimate a communication channel for a multi-carrier signal based on a received reference signal, the multi-carrier signal aggregating a plurality of component carriers. During a transmission time interval of the multi-carrier signal, the UE can perform a global search over a beam search space to obtain a beam index recommendation for a component carrier of the plurality of component carriers. The beam index recommendation corresponds to a maximized channel quality metric of the estimated communication channel and is indicative of a beam grid within the beam search space. The UE can perform a localized search of a subset of the beam search space to obtain a second beam index recommendation for a second component carrier of the plurality of component carriers.

25 Claims, 9 Drawing Sheets

(51) Int. Cl.

| | |
|---|---|
| ***H04B 17/364*** | (2015.01) |
| ***H04B 17/336*** | (2015.01) |
| ***H04B 7/04*** | (2017.01) |
| ***H04L 5/00*** | (2006.01) |
| ***H04B 7/0452*** | (2017.01) |

(52) U.S. Cl.

CPC ......... *H04B 7/0639* (2013.01); *H04B 7/0695* (2013.01); *H04B 17/336* (2015.01); *H04B 17/364* (2015.01); *H04L 5/0051* (2013.01); *H04L 25/0226* (2013.01)

(56) References Cited

U.S. PATENT DOCUMENTS

| | | | | |
|---|---|---|---|---|
| 2015/0071367 | A1* | 3/2015 | Hwang | H04B 7/0456 375/267 |
| 2015/0236774 | A1* | 8/2015 | Son | H04B 7/0628 375/267 |
| 2016/0134352 | A1 | 5/2016 | Stirling Gallacher | |
| 2017/0078004 | A1* | 3/2017 | Capar | H04W 16/28 |
| 2017/0134083 | A1* | 5/2017 | Kim | H04B 7/0617 |
| 2017/0272223 | A1* | 9/2017 | Kim | H04L 5/0048 |
| 2018/0063693 | A1* | 3/2018 | Chakraborty | H04W 8/005 |
| 2018/0198511 | A1* | 7/2018 | Maamari | H04B 7/04 |

OTHER PUBLICATIONS

"International Application Serial No. PCT US2017 063419, Written Opinion dated Mar. 5, 2018", 5 pgs.

Huawei, "Analysis on orthogonal non-orthogonal basis for advanced CSI feedback", R1-1609440, 3GPP TSG RAN WG1 Meeting #86bis, Lisbon, Portugal, (Oct. 1, 2016).

Intel, "UCI contents and UL control channel formats", R1-1609536, 3GPP TSG RAN WG1 Meeting #86bis, Lisbon, Portugal, (Oct. 1, 2016).

Lenovo, "Discussion of DL hybrid beamforming procedure", R1-1609395, 3GPP TSG RAN WG1 Meeting #86bis, Lisbon, Portugal, (Oct. 1, 2016).

* cited by examiner

500

Use Case 1: Single carrier, 2 PMI modes, acquisition period 20 subframes.

| | SF | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|---|---|---|---|
| CC0 | PMI Mode | | A | | | | T | | | | | | T | | | T | | | | T | | | | | | | A | | T | | |

Use Case 2: Single carrier, 3 PMI modes, acquisition period 20 frames, macro-tracking period 10 subframes.

| | SF | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|---|---|---|---|
| CC0 | PMI Mode | | A | | | | MI | | | | | MI | MA | | | MI | | | | MI | | | | MA | | | A | | MI | | |

| Use Case 3: Round robin acquisition/macro-tracking. Max 1 Acquisition and one MA at the same TTI. | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| SF | | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| CC0 | PMI Mode | | A | | | | MA | | | | | | A | | | MI | | | | A | | | | | | | MA | | | | |
| CC1 | PMI Mode | | MA | | | | A | | | MA | | | MA | | | A | | | | MA | | | A | | | | MI | | A | | MA |
| CC2 | PMI Mode | | MI | | | | | | | A | | | MI | | | MA | | | | | | | | | | | A | | MA | | A |

| Use Case 4: Acquisitions only allowed once per 20 subframes per carrier. In between only MA or MI allowed. Max 1 Acquisition and one MA at same TTI. | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| SF | | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| CC0 | PMI Mode | | A | | | | MI | | | | | | MA | | | MI | | | | MA | | | | | | | A | | | | |
| CC1 | PMI Mode | | MA | | | | A | | | MI | | | MI | | | MA | | | | MI | | | MA | | | | MI | | MA | | MI |
| CC2 | PMI Mode | | MI | | | | | | | A | | | MI | | | MI | | | | | | | | | | | MA | | MI | | A |

| Use Case 5: Acquisitions only allowed once per 20 SFs per carrier. In between only MA or MI allowed. Max 2 Acquisition and one MA at the same TTI. | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| SF | | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| CC0 | PMI Mode | | A | | | | MA | | | | | | MA | | | MI | | | | MI | | | | | | | A | | | | |
| CC1 | PMI Mode | | A | | | | MI | | | MA | | | MI | | | MI | | | | MI | | | A | | | | MI | | MI | | |
| CC2 | PMI Mode | | MA | | | | | | | A | | | MI | | | MI | | | | | | | | | | | MA | | MI | | |
| CC3 | PMI Mode | | MI | | | | A | | | | | | MI | | | MA | | | | MI | | | | | | | A | | | | |
| CC4 | PMI Mode | | MI | | | | A | | | MI | | | MI | | | MI | | | | MA | | | MA | | | | MI | | A | | |
| CC5 | PMI Mode | | MI | | | | | | | A | | | MI | | | MI | | | | | | | | | | | MI | | MA | | |

FIG. 9

CSI REPORTING IN BEAMFORMING SYSTEMS VIA TIME- AND FREQUENCY-DISTRIBUTED CSI ESTIMATION

TECHNICAL FIELD

Exemplary implementations of the present disclosure pertain to wireless communications. Some exemplary implementations relate to wireless networks including 3GPP (Third Generation Partnership Project) networks, 3GPP LTE (Long Term Evolution) networks, 3GPP LTE-A (LTE Advanced) networks, and fifth-generation (5G) networks. Other exemplary implementations are directed to channel state information (CSI) reporting in beamforming systems using time- and frequency-distributed CSI estimation.

BACKGROUND

Mobile data usage continues growing exponentially at a rate of nearly doubling year-after-year, and this trend is expected to continue. Although recent advances in cellular technology have made improvements in the performance and capacity of mobile networks, it is widely thought that such advances will still fall short of accommodating the anticipated demand for mobile data network service.

One approach to increasing mobile network capacity is utilizing higher-frequency radio bands. Millimeter-wave communications, for example, use radio frequencies in the range of 30-300 GHz to provide colossal bandwidth by today's standards—on the order of 20 Gb/s, for example. The propagation of millimeter-wave radio signals differs considerably from more familiar radio signals in the 2-5 GHz range. For one, their range is significantly limited by comparison due to attenuation in the atmosphere. In addition, millimeter-wave signals experience reflections, refractions, and scattering due to walls, buildings and other objects to a much greater extent than lower-frequency signals. These physical challenges also present some useful opportunities for communication system designers. For example, the limited range of millimeter-wave transmissions make them suitable for resource-element (time slot and frequency) reuse in high-density deployments in city blocks, office buildings, schools, stadiums, and the like, where there may be a large plurality of user equipment devices. In addition, the potential for precise directionality control provides opportunity to make extensive use of multi-user multiple input/multiple output (MU-MIMO) techniques. Solutions are needed to make practical use of these opportunities in highly-directional wireless networks.

Millimeter-wave or similar high-frequency communication systems typically employ a directional beamforming at the base station and user equipment in order to achieve a suitable signal-to-noise ratio (SNR) for link establishment. Acquisition/access procedures, which provide the base station and the user equipment a procedure with which to determine the best transmit and receive beamforming directions, are some of the most important aspects in the design and implementation of millimeter-wave or higher frequency communication systems.

BRIEF DESCRIPTION OF THE FIGURES

In the figures, which are not necessarily drawn to scale, like numerals may describe similar components in different views. Like numerals having different letter suffixes may represent different instances of similar components. Some exemplary implementations are illustrated by way of example, and not limitation, in the following figures of the accompanying drawings.

FIG. 5 is a diagram illustrating periodic switching between two beam/precoder search modes, in accordance with some exemplary implementations.

FIG. 6 is a diagram illustrating periodic switching between three beam/precoder search modes, in accordance with some exemplary implementations.

FIG. 7 is a diagram illustrating staggering of three beam/precoder search modes in a multi-carrier signal, in accordance with some exemplary implementations.

FIG. 8 is a diagram illustrating staggering of three beam/precoder search modes in a multi-carrier signal with a maximum periodicity of a global search mode, in accordance with some exemplary implementations.

FIG. 9 is a diagram illustrating staggering of three beam/precoder search modes in a multi-carrier signal including a periodic global search mode, in accordance with some exemplary implementations.

DETAILED DESCRIPTION

The following description and the drawings sufficiently illustrate specific exemplary implementations of the present disclosure to enable those skilled in the art to practice them. A number of examples are described in the context of 3GPP communication systems and components thereof. It will be understood that principles of the exemplary implementations are applicable in other types of communication systems, such as Wi-Fi or Wi-Max networks, Bluetooth or other personal-area networks, Zigbee or other home-area networks, wireless mesh networks, and the like, without limitation, unless expressly limited by a corresponding claim. Given the benefit of the present disclosure, persons skilled in the relevant technologies will be able to engineer suitable variations to implement principles of the exemplary implementations in other types of communication systems. Various diverse exemplary implementations of the present disclosure may incorporate structural, logical, electrical, process, and other differences. Portions and features of some exemplary implementations may be included in, or substituted for, those of other exemplary implementations. Exemplary implementations of the present disclosure set forth in the claims encompass all presently-known, and after-arising, equivalents of those claims.

As used herein, the term "exemplary implementation" (or "exemplary implementations") relate to implementations of the present disclosure.

Figure 1:
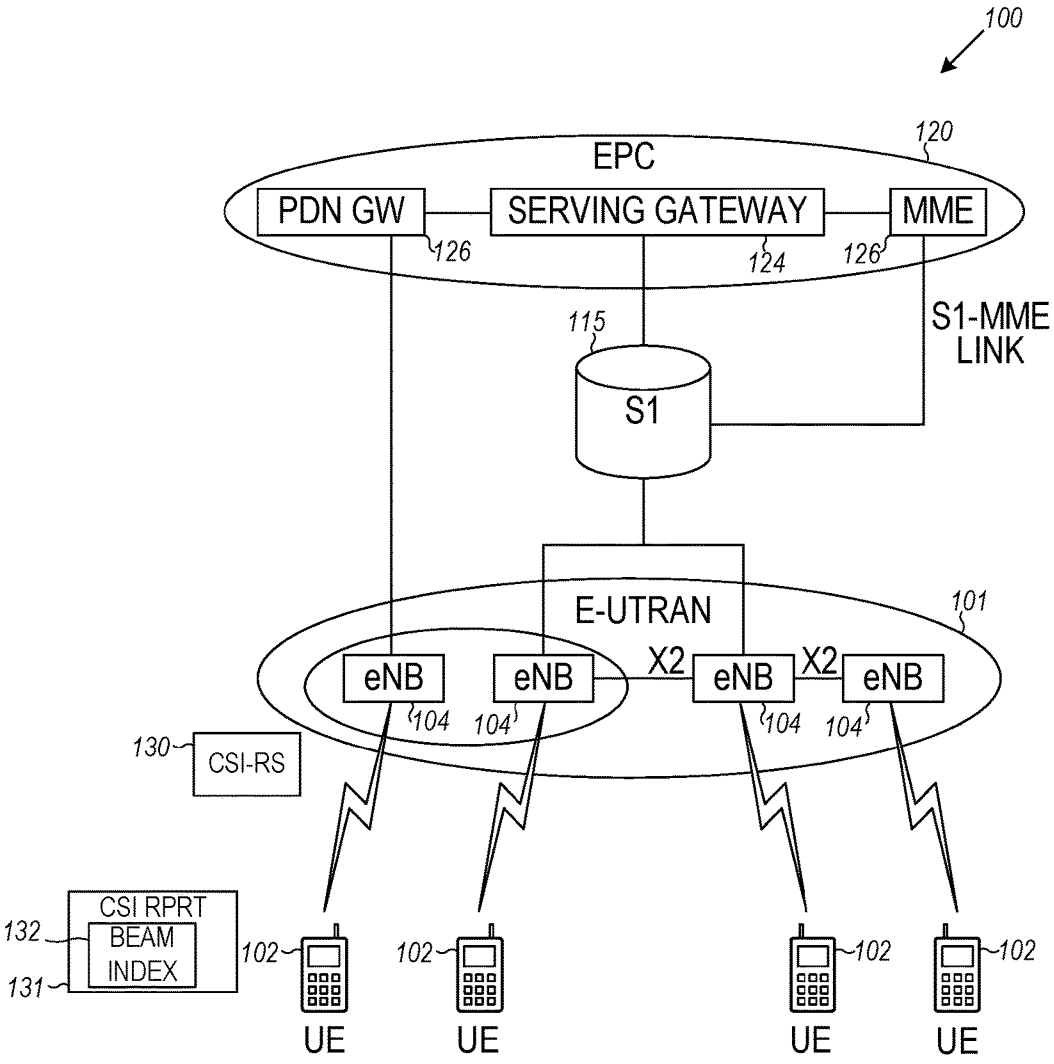
FIG. 1 is a functional diagram of a 3GPP network in accordance with some exemplary implementations.

FIG. 1 shows an example of a portion of an end-to-end network architecture of a Long Term Evolution (LTE) network with various components of the network in accordance with some exemplary implementations. As used herein, LTE and LTE-A networks and devices are referred to merely as LTE networks and devices. The network 100 may comprise a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 includes a mobility management entity (MME) 122, a serving gateway (serving GW) 124, and packet data network gateway (PDN GW) 126. The RAN 101 includes Evolved Node-B's (eNB) 104 (which may operate as base stations) for communicating with User Equipment (UE) 102. The eNBs 104 may include macro eNBs and low power (LP) eNBs, such as micro, pico or femto eNBs. In accordance with some exemplary implementations, the eNB 104 may transmit a downlink control message to the UE 102 to indicate an allocation of physical uplink control channel (PUCCH) channel resources. The UE 102 may receive the downlink control message from the eNB 104, and may transmit an uplink control message to the eNB 104 in at least a portion of the PUCCH channel resources.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro, micro, pico or femto) may terminate the air interface protocol and may be the first point of contact for a UE 102. At least some of the eNBs 104 may be in a cell 106, in which the eNBs 104 of the cell 106 may be controlled by the same processor or set of processors. In some exemplary implementations of the present disclosure, an eNB 104 may be in a single cell 106, while in other exemplary implementations the eNB 104 may be a member of multiple cells 106. In some exemplary implementations, an eNB 104 may fulfill various logical functions for the RAN 101 including but not limited to RNC (radio network controller functions) such as radio bearer management, uplink and downlink dynamic radio resource management and data packet scheduling, and mobility management. In accordance with exemplary implementations, UEs 102 may be configured to communicate Orthogonal frequency-division multiplexing (OFDM) communication signals with an eNB 104 over a multicarrier communication channel in accordance with an OFDMA communication technique. The OFDM signals may comprise a plurality of orthogonal subcarriers. Each of the eNBs 104 may be able to transmit a reconfiguration message to each UE 102 that is connected to that eNB 104. The reconfiguration message may contain reconfiguration information including one or more parameters that indicate specifics about reconfiguration of the UE 102 upon a mobility scenario (e.g., handover) to reduce the latency involved in the handover. The parameters may include physical layer and layer 2 reconfiguration indicators, and a security key update indicator. The parameters may be used to instruct the UE 102 to avoid or skip one or more of the processes indicated to decrease messaging between the UE 102 and the network. The network may be able to automatically route packet data between the UE 102 and the new eNB 104 and may be able to provide the desired information between the eNBs 104 involved in the mobility. The application, however, is not limited to this, however, and additional exemplary implementations are described in more detail below.

The S1 interface 115 is the interface that separates the RAN 101 and the EPC 120. It is split into two parts: the S1-U, which carries traffic data between the eNB 104 and the serving GW 124, and the S1-MME, which is a signaling interface between the eNB 104 and the MME 122. The X2 interface is the interface between eNB 104. The X2 interface comprises two parts, the X2-C and X2-U. The X2-C is the control plane interface between the eNB 104, while the X2-U is the user plane interface between the eNB 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which contains ten 1 ms subframes. Each subframe, in turn, may contain two slots of 0.5 ms. Each slot may contain 6-7 symbols, depending on the system used. A resource block (RB) (also called physical resource block (PRB)) may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block. In Frequency Division Duplexed (FDD) mode, both the uplink and downlink frames may be 10 ms and may be frequency (full-duplex) or time (half-duplex) separated. In Time Division Duplexed (TDD), the uplink and downlink subframes may be transmitted on the same frequency and may be multiplexed in the time domain. A downlink resource grid may be used for downlink transmissions from an eNB to a UE. The grid may be a time-frequency grid, which is the physical resource in the downlink in each slot. Each column and each row of the resource grid may correspond to one OFDM symbol and one OFDM subcarrier, respectively. The duration of the resource grid in the time domain may correspond to one slot. The smallest time-frequency unit in a resource grid may be denoted as a resource element. Each resource grid may comprise a number of the above resource blocks, which describe the mapping of certain physical channels to resource elements. Each resource block may comprise 12 (subcarriers)*14 (symbols)=168 resource elements.

In some exemplary implementations, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. Two example physical downlink channels are the physical downlink shared channel and the physical down link control channel.

There may be several different physical downlink channels that are conveyed using such resource blocks. Two of these physical downlink channels may be the physical down link control channel (PDCCH) and the physical downlink shared channel (PDSCH). Each subframe may be partitioned into the PDCCH and the PDSCH.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARM) information related to the uplink shared channel. Typically, downlink scheduling (e.g., assigning control and shared channel resource blocks to UE 102 within a cell) may be performed at the eNB 104 based on channel quality information fed back from the UE 102 to the eNB 104, and then the downlink resource assignment information may be sent to the UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of downlink control information (DCI) and the channel condition. There may be four or more different PDCCH formats defined in LTE with different numbers of CCEs (e.g., aggregation level, L=1, 2, 4, or 8).

In an example, the network 100 may employ link adaptation, whereby transmit signal (e.g., signal transmitted by eNB 104) is modified based on channel state information (CSI) (e.g., CSI report 131 from the UE 102) to enhance throughput performance. CSI may be represented as transmission parameters such as modulation and coding scheme (MCS), transmission rank, beam index (e.g., 132), and precoding matrix. CSI in some systems with reciprocal channels can be obtained at the transmitter, but in most systems the information can be gathered at the receiver (e.g., UE 102) in response to a CSI reference signal (e.g., CSI-RS 130 from the eNB 104) then fed back to the transmitter over a wireless channel (e.g., an uplink channel). Since the uplink channel is bandwidth-limited, the CSI report (or CSI) 131 may comprise distinct metrics, each of which takes finite discrete form and, hence, can be identified via a discrete indicator. In a beamforming system, these CSI metrics may include indicators identifying preferred beam(s) and precoder(s). As used herein, the term "beam index" can indicate such preferred beam(s) and/or precoder(s).

The search set at the receiver for preferred beams and precoders becomes larger with more antennas and narrower beamwidth for higher beamforming gain, and it can be sufficiently large to make exhaustive search impractical. This is especially true in 3D beamforming, where a beam is associated with two orthogonal dimensions. As an example, in 3GPP LTE Rel-13 FD-MIMO (full dimension multiple-input multiple-output) systems, the number of beam and precoder combinations can reach up to 2048 for a given rank, a factor of 8 higher compared to the largest codebook (8-TX) before Rel-13.

The beam and precoder search complexity for a UE can be further compounded in multiple carrier systems, such as carrier aggregation schemes (as in LTE-Advanced), where the search computation load can scale linearly with the number of component carriers (CCs). For example, an LTE Rel-13 system may support up to 32 component carriers leading to a scaling factor of 32 for the highest search complexity case.

In an example, the network 100 can operate using LTE Rel-13 FD-MIMO Class A, where the transmitter (eNB 104) beamforming and precoding can be jointly represented by a codebook, the maximum size of which can be as large as 2048. The precoders with 8 or more transmit (TX) antennas can be associated with two indexes denoted as $i_1$ and $i_2$, where $i_1$ can be associated with longer term channel statistics, while $i_2$ can represent a select number of beams within a group of neighboring beams (i.e., a beam grid), as well as cross-beam and cross-polarization phase differences. Additionally, in instances when the network 100 uses 3D beamforming, the $i_1$ index may be separated into an $i_{1,1}$ index and an $i_{1,2}$ index representing two orthogonal spatial dimensions (e.g., azimuth and elevation). In an example, precoder search solutions for LTE beamforming systems may decouple the $i_1$ search from the $i_2$ search, thereby avoiding a joint $i_1$ and $i_2$ search over the entire codebook. However, in instances when the network 100 uses 3D beamforming and large-scale carrier aggregation, the decoupling alone can be insufficient for maintaining UE complexity.

In an example, the network 100 can operate based on LTE FD-MIMO, using $i_{1,1}$ and $i_{1,2}$ to indicate a "beam grid" (a group of adjacent beams) and $i_2$ to indicate the exact beam within the beam grid as well as co-phasing. A pair $\{i_{1,1}, i_{1,2}\}$ can be referred to as $i_1$ index. Thus, the beam can be said to be identified by three indices $\{i_{1,1}, i_{1,2}, i_2\}$, or by two indices $\{i_1, i_2\}$, where the last index $i_2$ gives extra CSI information in addition to the beam information. In general, a logical (or conceptual) beam index may or may not map one-to-one to actual CSI indices.

Even though determination and communication of a beam index (or beam indexes) is discussed herein, the disclosure is not limited in this regard and one or more precoders (or precoder indexes) can be determined using similar functionalities as used for the beam indexes. Additionally, a set of beam indexes and a set of precoder indexes can wholly or partially overlap, or do not overlap at all. For example, in instances when the network 100 is an LTE network, there is no "beam index" per se, but rather the beam index information is embedded within a precoding matrix indicator (PMI). In this example, a "beam index" can be interpreted as a "precoder" which is associated with the PMI. In instances when the network 100 is a 5G network, a separate beam index can be used in addition to a precoder index (or PMI), with the precoder being used for, e.g., digital co-phasing.

Depending on the eNB and UE antenna configuration as well as the selected codebook and number of layers, the complexity for a beam/precoder search for a single component carrier can be highly demanding for implementation. Combined with the support of a large number of component carriers, this can lead to high worst case complexity. In accordance with proposed techniques, the complexity can be addressed by introducing different beam search modes/categories in combination with a spectral staggering of beam search modes associated with a high complexity, thereby reducing the overall peak complexity over all carriers. The reduction in peak complexity can result in reducing hardware complexity as well, such as die size, as well as reducing power consumption due to more efficient search modes.

Disclosed techniques for beam index (or precoder) search take advantage of the time-coherence of the optimal group of adjacent beams that is expected in a wide range of 3D channels, and can include: (1) temporal distribution of CSI estimation via multiple beam/precoder search modes with different sizes of beam search set; and (2) spectral distribution of CSI estimation in multi-carrier systems via staggered large-set search over carriers.

(1) Temporal distribution of CSI estimation via multiple beam/precoder search modes with different sizes of beam search set.

In an example, at least two beam search modes can be used—a global search mode (also referred to as acquisition mode) and a local search mode (also referred to as tracking mode). The acquisition mode can be used for carrying out a global beam/precoder search. The tracking mode can be used for carrying out a local beam/precoder search, where the locality is determined based on history of previous acquisition and/or tracking instances. For example, previous beam index data obtained via acquisition and/or tracking can be stored and obtained for purposes of determining a beam grid for a subsequent beam index search. Depending on the expected channel statistics, the tracking mode can be further divided into several sub-modes with varying complexities, e.g. macro-tracking and micro-tracking as explained herein below.

(2) Spectral distribution of CSI estimation in multi-carrier systems via staggered large-set search over carriers.

In an example, the beam index acquisition instances can be staggered such that only a limited number of simultaneous CSIs are on the acquisition mode (e.g., when performing a beam index search for multiple component carriers in the same transmission time interval, or TTI).

In an example, temporal and spectral distribution of CSI estimation can be combined, which allows for reduction of the peak per-TTI complexity for a UE supporting 3D beamforming in multiple carrier network.

The following is an example for reduction of the peak per-TTI complexity for a UE supporting 3D beamforming in multiple carrier FD-MIMO network (three component carriers, or CCs) using 16 antennas.

In the case of FD-MIMO class A CSI reporting according to Rel-13 with 16 antenna ports, the number of hypotheses for $i_1$ is as high as 1024 (32 possibilities for $i_{1,1}$ and 32 possibilities for $i_{1,2}$). In addition, there are two hypotheses for $i_2$. Even if the $i_1$ and $i_2$ searches are treated separately, the overall number of possibilities for a single component carrier is 1026. If a carrier aggregation with three component carriers (CCs) is assumed, the number of precoders for which a CSI needs to be computed increases to a total of 3078.

In accordance with proposed techniques (e.g., as explained in reference to FIGS. 4-10), for a given TTI, only a single component carrier can be in acquisition mode, while the second carrier is in macro-tracking mode and the third carrier is in micro-tracking mode (macro-tracking and micro-tracking sub-modes are explained herein below). Assuming a reduced set of 9 hypotheses for the $i_{1,1}$ and $i_{1,2}$ search in macro-tracking mode and no $i_1$ search in micro-tracking mode, the overall complexity can be reduced, as seen in Table 1.

TABLE 1

Complexity evaluation for the example of Release 13 FD-MIMO Class A CSI Reporting

| | Conventional "Brute Force" Search | | Beam Index Search Using Proposed Techniques | |
|---|---|---|---|---|
| | $i_1$ | $i_2$ | $i_1$ | $i_2$ |
| Carrier 0 | 1024 | 2 | 1024 | 2 |
| Carrier 1 | 1024 | 2 | 9 | 2 |
| Carrier 2 | 1024 | 2 | 1 | 2 |
| Total | 3078 | | 1040 | |

As seen in Table 1, the savings in complexity for a beam index search can be in the order of 64% compared to a brute-force state-of-the-art approach. In this regard, applying an acquisition and/or tracking search modes in lieu of searching the entire codebook (or beam search space) can reduce the absolute number of beam search hypotheses.

As used herein, the term circuitry may refer to, be part of, or include an Application Specific Integrated Circuit (ASIC), an electronic circuit, a processor (shared, dedicated, or group), or memory (shared, dedicated, or group) that executes one or more software or firmware programs, a combinational logic circuit, or other suitable hardware components that provide the described functionality. In some exemplary implementations, the circuitry may be implemented in, or functions associated with the circuitry may be implemented by, one or more software or firmware modules.

In some exemplary implementations, circuitry may include logic, at least partially operable in hardware. Exemplary implementations described herein may be implemented into a system using any suitably configured hardware or software.

Figure 2:
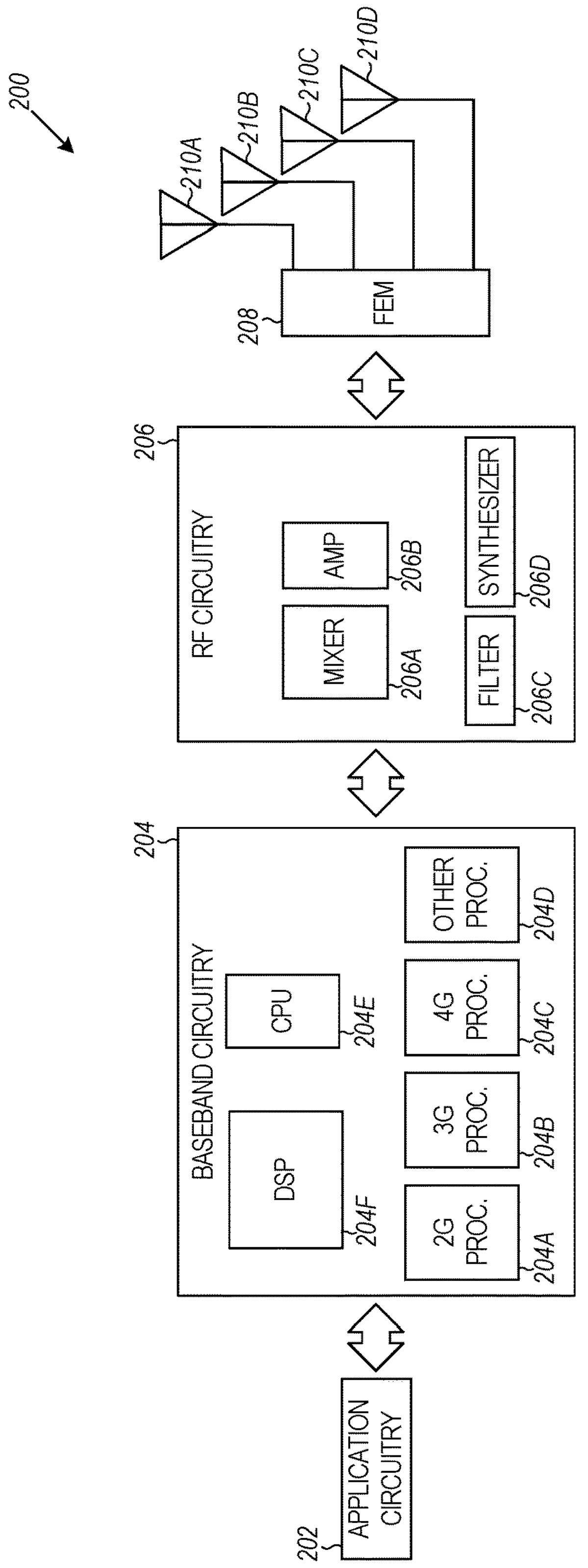
FIG. 2 is a block diagram of a User Equipment (UE) in accordance with some exemplary implementations.

FIG. 2 is a functional diagram of a User Equipment (UE) in accordance with some exemplary implementations. The UE 200 may be suitable for use as a UE 102 as depicted in FIG. 1. In some exemplary implementations, the UE 200 may include application circuitry 202, baseband circuitry 204, Radio Frequency (RF) circuitry 206, front-end module (FEM) circuitry 208, and multiple antennas 210A-210D, coupled together at least as shown. In some exemplary implementations, other circuitry or arrangements may include one or more elements or components of the application circuitry 202, the baseband circuitry 204, the RF circuitry 206 or the FEM circuitry 208, and may also include other elements or components in some cases. As an example, "processing circuitry" may include one or more elements or components, some or all of which may be included in the application circuitry 202 or the baseband circuitry 204. As another example, "transceiver circuitry" may include one or more elements or components, some or all of which may be included in the RF circuitry 206 or the FEM circuitry 208. These examples are not limiting, however, as the processing circuitry or the transceiver circuitry may also include other elements or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the system to perform one or more of the functionalities described herein.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some exemplary implementations, the baseband circuitry 204 may include a second generation (2G) baseband processor 204*a*, third generation (3G) baseband processor 204*b*, fourth generation (4G) baseband processor 204*c*, or other baseband processor(s) 204*d* for other existing generations, generations in development or to be developed in the future (e.g., fifth generation (5G), 6G, etc.). The baseband circuitry 204 (e.g., one or more of baseband processors 204*a-d*) may handle various radio control functions that enable communication with one or more radio networks via the RF circuitry 206. The radio control functions may include, but are not limited to, signal modulation/demodulation, encoding/decoding, radio frequency shifting, etc. In some exemplary implementations, modulation/demodulation circuitry of the baseband circuitry 204 may include Fast-Fourier Transform (FFT), precoding, or constellation mapping/demapping functionality. In some exemplary implementations, encoding/decoding circuitry of the baseband circuitry 204 may include Low Density Parity Check (LDPC) encoder/decoder functionality, optionally along-side other techniques such as, for example, block codes, convolutional codes, turbo codes, or the like, which may be used to support legacy protocols. Exemplary implementations of modulation/demodulation and encoder/decoder functionality are not limited to these examples and may include other suitable functionality in other exemplary implementations.

In some exemplary implementations, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), or radio resource control (RRC) elements. A central processing unit (CPU) 204*e* of the baseband circuitry 204 may be configured to run elements of the protocol stack for signaling of the PHY, MAC, RLC, PDCP or RRC layers. In some exemplary implementations, the baseband circuitry may include one or more audio digital signal processor(s) (DSP) 204*f*. The audio DSP(s) 204*f* may be include elements for compression/decompression and echo cancellation and may include other suitable processing elements in other exemplary implementations. Components of the baseband circuitry may be suitably combined in a single chip, a single chipset, or disposed on a same circuit board in some exemplary implementations. In some exemplary implementations, some or all of the constituent components of the baseband circuitry 204 and the application circuitry 202 may be implemented together such as, for example, on a system on chip (SOC).

In some exemplary implementations, the baseband circuitry 204 may provide for communication compatible with one or more radio technologies. For example, in some exemplary implementations, the baseband circuitry 204 may support communication with an evolved universal terrestrial radio access network (EUTRAN) or other wireless metropolitan area networks (WMAN), a wireless local area network (WLAN), a wireless personal area network (WPAN). Exemplary implementations in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various exemplary implementations, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some exemplary implementations, the RF circuitry 206 may include a receive signal path and a transmit signal path. The receive signal path of the RF circuitry 206 may include mixer circuitry 206*a*, amplifier circuitry 206*b* and filter circuitry 206*c*. The transmit signal path of the RF circuitry 206 may include filter circuitry 206*c* and mixer circuitry 206*a*. RF circuitry 206 may also include synthesizer circuitry 206*d* for synthesizing a frequency for use by the mixer circuitry 206*a* of the receive signal path and the transmit signal path. In some exemplary implementations, the mixer circuitry 206*a* of the receive signal path may be configured to down-convert RF signals received from the FEM circuitry 208 based on the synthesized frequency provided by synthesizer circuitry 206*d*. The amplifier circuitry 206*b* may be configured to amplify the down-converted signals and the filter circuitry 206*c* may be a low-pass filter (LPF) or band-pass filter (BPF) configured to remove unwanted signals from the down-converted signals to generate output baseband signals. Output baseband signals may be provided to the baseband circuitry 204 for further processing. In some exemplary implementations, the output baseband signals may be zero-frequency baseband signals, although this is not a requirement. In some exemplary implementations, mixer circuitry 206*a* of the receive signal path may comprise passive mixers, although the scope of the exemplary implementations is not limited in this respect. In some exemplary implementations, the mixer circuitry 206*a* of the transmit signal path may be configured to up-convert input baseband signals based on the synthesized frequency provided by the synthesizer circuitry 206*d* to generate RF output signals for the FEM circuitry 208. The baseband signals may be provided by the baseband circuitry 204 and may be filtered by filter circuitry 206*c*. The filter circuitry 206*c* may include a low-pass filter (LPF), although the scope of the exemplary implementations is not limited in this respect.

In some exemplary implementations, the mixer circuitry 206*a* of the receive signal path and the mixer circuitry 206*a* of the transmit signal path may include two or more mixers and may be arranged for quadrature downconversion or upconversion respectively. In some exemplary implementations, the mixer circuitry 206*a* of the receive signal path and the mixer circuitry 206*a* of the transmit signal path may include two or more mixers and may be arranged for image rejection (e.g., Hartley image rejection). In some exemplary implementations, the mixer circuitry 206*a* of the receive signal path and the mixer circuitry 206*a* may be arranged for direct downconversion or direct upconversion, respectively. In some exemplary implementations, the mixer circuitry 206*a* of the receive signal path and the mixer circuitry 206*a* of the transmit signal path may be configured for super-heterodyne operation.

In some exemplary implementations, the output baseband signals and the input baseband signals may be analog baseband signals, although the scope of the exemplary implementations is not limited in this respect. In some alternate exemplary implementations, the output baseband signals and the input baseband signals may be digital baseband signals. In these alternate exemplary implementations, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode exemplary implementations, a separate radio IC circuitry may be provided for processing signals for each spectrum, although the scope of the exemplary implementations is not limited in this respect.

In some exemplary implementations, the synthesizer circuitry 206*d* may be a fractional-N synthesizer or a fractional N/N+1 synthesizer, although the scope of the exemplary implementations is not limited in this respect as other types of frequency synthesizers may be suitable. For example, synthesizer circuitry 206*d* may be a delta-sigma synthesizer, a frequency multiplier, or a synthesizer comprising a phase-locked loop with a frequency divider. The synthesizer circuitry 206*d* may be configured to synthesize an output frequency for use by the mixer circuitry 206*a* of the RF circuitry 206 based on a frequency input and a divider control input. In some exemplary implementations, the synthesizer circuitry 206*d* may be a fractional N/N+1 synthesizer. In some exemplary implementations, frequency input may be provided by a voltage controlled oscillator (VCO), although that is not a requirement. Divider control input may be provided by either the baseband circuitry 204 or the applications processor 202 depending on the desired output frequency. In some exemplary implementations, a divider control input (e.g., N) may be determined from a look-up table based on a channel indicated by the applications processor 202.

Synthesizer circuitry 206*d* of the RF circuitry 206 may include a divider, a delay-locked loop (DLL), a multiplexer and a phase accumulator. In some exemplary implementations, the divider may be a dual modulus divider (DMD) and the phase accumulator may be a digital phase accumulator (DPA). In some exemplary implementations, the DMD may be configured to divide the input signal by either N or N+1 (e.g., based on a carry out) to provide a fractional division ratio. In some example exemplary implementations, the DLL may include a set of cascaded, tunable, delay elements, a phase detector, a charge pump and a D-type flip-flop. In these exemplary implementations, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some exemplary implementations, synthesizer circuitry 206*d* may be configured to generate a carrier frequency as the output frequency, while in other exemplary implementations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some exemplary implementations, the output frequency may be a LO frequency (fLO). In some exemplary implementations, the RF circuitry 206 may include an IQ/polar converter.

FEM circuitry 208 may include a receive signal path, which may include circuitry configured to operate on RF signals received from one or more of the antennas 210A-D, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210A-D.

In some exemplary implementations, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In some exemplary implementations, the UE 200 may include additional elements such as, for example, memory/storage, display, camera, sensor, or input/output (I/O) interface.

Figure 3:
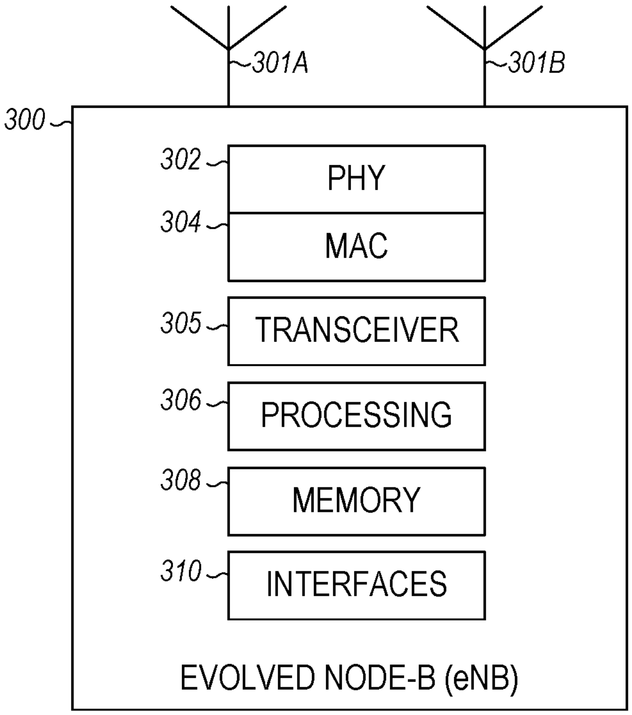
FIG. 3 is a block diagram of an Evolved Node-B (eNB) in accordance with some exemplary implementations.

FIG. 3 is a functional diagram of an Evolved Node-B (eNB) in accordance with some exemplary implementations. It should be noted that in some exemplary implementations, the eNB 300 may be a stationary non-mobile device. The eNB 300 may be suitable for use as an eNB 104 as depicted in FIG. 1. The components of eNB 300 may be included in a single device or a plurality of devices. The eNB 300 may include physical layer (PHY) circuitry 302 and a transceiver 305, one or both of which may enable transmission and reception of signals to and from the UE 200, other eNBs, other UEs or other devices using one or more antennas 301A-B. As an example, the physical layer circuitry 302 may perform various encoding and decoding functions that may include formation of baseband signals for transmission and decoding of received signals. For example, physical layer circuitry 302 may include LDPC encoder/decoder functionality, optionally along-side other techniques such as, for example, block codes, convolutional codes, turbo codes, or the like, which may be used to support legacy protocols. Exemplary implementations of modulation/demodulation and encoder/decoder functionality are not limited to these examples and may include other suitable functionality in other exemplary implementations. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNB 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 210A-D (in the UE) and 301A-B (in the eNB) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) exemplary implementations, the antennas 210A-D, 301A-B may be effectively separated to take advantage of spatial diversity and the different channel characteristics that may result.

In some exemplary implementations, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive or transmit information wirelessly. In some exemplary implementations, the UE 200 or eNB 300 may be configured to operate in accordance with 3GPP standards, although the scope of the exemplary implementations is not limited in this respect. Mobile devices or other devices in some exemplary implementations may be configured to operate according to other protocols or standards, including IEEE 802.11 or other IEEE standards. In some exemplary implementations, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements may be combined and may be implemented by combinations of software-configured elements, such as processing elements including digital signal processors (DSPs), or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some exemplary implementations, the functional elements may refer to one or more processes operating on one or more processing elements.

Exemplary implementations may be implemented in one or a combination of hardware, firmware and software. Exemplary implementations may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some exemplary implementations may include one or more processors and may be configured with instructions stored on a computer-readable storage device.

It should be noted that in some exemplary implementations, an apparatus used by the UE 200 or eNB 300 may include various components of the UE 200 or the eNB 300 as shown in FIG. 2 and FIG. 3. Accordingly, techniques and operations described herein that refer to the UE 200 (or 102) may be applicable to an apparatus for a UE. In addition, techniques and operations described herein that refer to the eNB 300 (or 104) may be applicable to an apparatus for an eNB.

Even though specific durations (e.g., time interval duration, transmission time etc.) and specific bit sequence sizes are mentioned herein, the disclosure may not be limited in this regard, and specific numbering designations are for illustrative purposes only.

Figure 4:
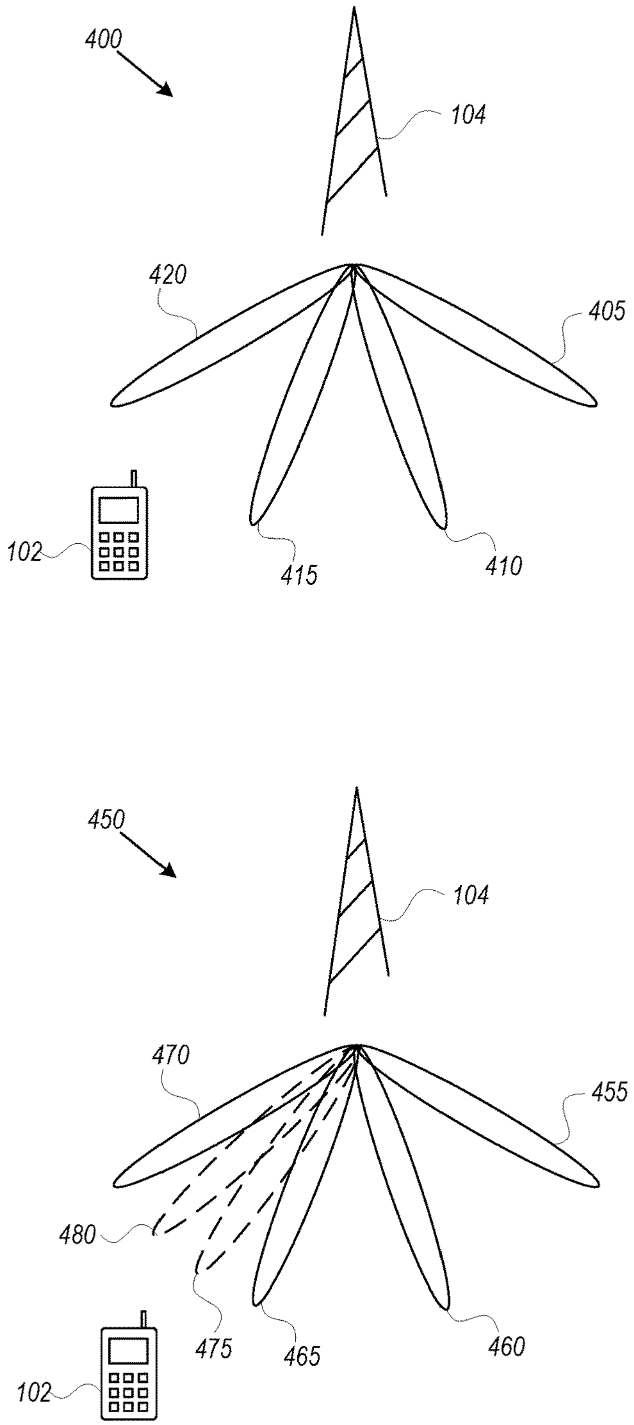
FIG. 4 illustrates examples of multiple beam transmission in accordance with some exemplary implementations.

FIG. 4 illustrates examples of multiple beam transmission in accordance with some exemplary implementations. Although the example scenarios 400 and 450 depicted in FIG. 4 may illustrate some aspects of techniques disclosed herein, it will be understood that exemplary implementations are not limited by example scenarios 400 and 450. Exemplary implementations are not limited to the number or type of components shown in FIG. 4 and are also not limited to the number or arrangement of transmitted beams shown in FIG. 4.

In example scenario 400, the eNB 104 may transmit a signal on multiple beams 405-420, any or all of which may be received at the UE 102. It should be noted that the number of beams or transmission angles as shown are not limiting. As the beams 405-420 may be directional, transmitted energy from the beams 405-420 may be concentrated in the direction shown. Therefore, the UE 102 may not necessarily receive a significant amount of energy from beams 405 and 410 in some cases, due to the relative location of the UE 102.

UE 102 may receive a significant amount of energy from the beams 415 and 420 as shown. As an example, the beams 405-420 may be transmitted using different reference signals, and the UE 102 may determine channel-state information (CSI) feedback or other information for beams 415 and 420. In some exemplary implementations, each of beams 405-420 are configured as CSI reference signals (CSI-RS). In related exemplary implementations, the CSI-RS signal is a part of the discovery reference signaling (DRS) configuration. The DRS configuration may serve to inform the UE 102 about the physical resources (e.g., subframes, subcarriers) on which the CSI-RS signal will be found. In related exemplary implementations, the UE 102 is further informed about any scrambling sequences that are to be applied for CSI-RS.

In some exemplary implementations, up to 2 MIMO layers may be transmitted within each beam by using different polarizations. More than 2 MIMO layers may be transmitted by using multiple beams. In related exemplary implementations, the UE is configured to discover the available beams and report those discovered beams to the eNB prior to the MIMO data transmissions using suitable reporting messaging. Based on the reporting messaging, the eNB 104 may determine suitable beam directions for the MIMO layers to be used for data communications with the UE 102. In various exemplary implementations, there may be up to 2, 4, 8, 16, 32, or more MIMO layers, depending on the number of MIMO layers that are supported by the eNB 104 and UE 102. In a given scenario, the number of MIMO layers that may actually be used will depend on the quality of the signaling received at the UE 102, and the availability of reflected beams arriving at diverse angles at the UE 102 such that the UE 102 may discriminate the data carried on the separate beams.

In the example scenario 450, the UE 102 may determine angles or other information (such as CSI feedback/report, including beam index, precoder, channel-quality indicator (CQI) or other) for the beams 465 and 470. The UE 102 may also determine such information when received at other angles, such as the illustrated beams 475 and 480. The beams 475 and 480 are demarcated using a dotted line configuration to indicate that they may not necessarily be transmitted at those angles, but that the UE 102 may determine the beam directions of beams 475 and 480 using such techniques as receive beam-forming, as receive directions. This situation may occur, for example, when a transmitted beam reflects from an object in the vicinity of the UE 102, and arrives at the UE 102 according to its reflected, rather than incident, angle.

In some exemplary implementations, the UE 102 may transmit one or more CSI messages (or reports) to the eNB 104 as reporting messaging (e.g., CSI report 131 including beam index information 132). Exemplary implementations are not limited to dedicated CSI messaging, however, as the UE 102 may include relevant reporting information in control messages or other types of messages that may or may not be dedicated for communication of the CSI-type information.

As an example, the first signal received from the first eNB 104 may include a first directional beam based at least partly on a first reference signal and a second directional beam based at least partly on a second reference signal. The UE 102 may determine a rank indicator (RI) for the first reference signal and an RI for the second reference signal, and may transmit both RIs in the CSI messages. In an example, the reference signal (RS) can be a CSI-RS or a cell-specific reference signal (CRS). In addition, the UE 102 may determine one or more RIs for the second signal, and may also include them in the CSI messages in some cases. In some exemplary implementations, the UE 102 may also determine a CQI, a precoding matrix indicator (PMI), receive angles or other information for one or both of the first and second signals. Such information may be included, along with one or more RIs, in the one or more CSI messages. In some exemplary implementations, the UE 102 performs reference signal receive power (RSRP) measurement, received signal strength indication (RSSI) measurement, reference signal receive quality (RSRQ) measurement, or some combination of these using reference signals.

As an example, the first signal received from the eNB 104 may include a first directional beam based at least partly on a first reference signal and a second directional beam based at least partly on a second reference signal. The UE 102 may determine a first measurement for the first directional beam and a second measurement for the second directional beam. In addition, the UE 102 may determine first and second CQIs related to reception of the signal at the first and second angles. The UE 102 may also determine a selected angle between the first angle and the second angle, wherein a CQI for reception of the first signal at the selected angle is greater than the first and second CQIs. The selected angle may be a better angle for reception in comparison to the first and second angles, in some cases.

In some exemplary implementations, the selected angle or the CQI for reception of the first signal at the selected angle may be indicated in the one or more CSI messages, in addition to or instead of other CSI feedback described herein. In some exemplary implementations, the UE 102 may be configured with one or more CSI processes per serving cell by higher layers. Each CSI process may be associated with a CSI Reference Signal (CSI-RS) resource and a CSI-interference measurement (CSI-IM).

In some exemplary implementations, the beam discovery procedure may be facilitated using beam index information determined by the UE using acquisition and tracking techniques described herein. More specifically, techniques disclosed herein can be used for temporal distribution of CSI estimation via multiple beam/precoder search modes with a varying beam search grid, as explained in greater detail in the following examples.

Example 1. Acquisition and Tracking Search Modes

During an example acquisition search mode, the UE 102 may perform a global search of a beam search space to find an optimal grid of beams followed by a suitable selection of the best beam/polarization within the grid of beams. Acquisition mode can be used by the UE 102 for an initial search, after a reset due to radio link failure, or when certain parameters indicate a significant change of the grid of beams.

During an example tracking search mode, the UE 102 may perform a search of the beam space where the search set size and coverage are reduced to a small number of beam grids (can be also a single grid of beams) in the vicinity of the last determined beam grid (e.g., during acquisition), followed by a search of an optimal beam/polarization within the grid of beams.

Example 2. Macro-Tracking and Micro-Tracking Search Sub-Modes

During an example macro-tracking search mode, the UE 102 can reduce the beam search space to a small number of beam grids in the vicinity of the last determined beam grid (e.g., the grid of beams corresponding to a beam index determined during acquisition), followed by a search of an optimal beam/polarization within the grid of beams. Macro-tracking mode can be enabled periodically or aperiodically when, e.g., a changing grid of beams is detected.

During an example micro-tracking search mode, the UE 102 can search only the beams/polarizations within a previously selected grid of beams (e.g., a beam grid associated with a beam index obtained during the last acquisition search).

The search complexity for the acquisition, macro-tracking and micro-tracking varies, with acquisition having highest search complexity and micro-tracking having the lowest search complexity. In this regard, the acquisition mode can be used less frequently due to its higher complexity. In contrast, the tracking modes can be used more often due to their reduced complexity compared to the acquisition mode. Switching between the different modes can be done in a periodic or aperiodic manner, e.g., as provided in the following examples.

Example 3. Periodic Switching

In an example, the UE 102 can periodically switch to acquisition mode. In between performing acquisition mode, the UE 102 can perform tracking mode to save power. If, for example, two tracking modes (macro/micro) are allowed, the period of the acquisition mode could be, for example, a multiple of the macro search mode period.

FIG. 5 is a diagram illustrating periodic switching between two beam/precoder search modes, in accordance with some exemplary implementations. Referring to FIG. 5, there is illustrated table 500 of search mode switching in a single carrier LTE system. As seen in table 500, the minimum distance between two consecutive acquisitions (A) is 20 subframes. In between the acquisition mode searches, the tracking mode (T) can be used in instances when a beam/precoder report is requested.

FIG. 6 is a diagram illustrating periodic switching between three beam/precoder search modes, in accordance with some exemplary implementations. Referring to FIG. 6, there is illustrated a table 600 of the periodic switching of three beam index search modes—acquisition (or global search), macro- and micro-tracking (or a localized search of the beam search space). As seen in FIG. 6, the period for acquisition (A) is 20 subframes, i.e. 2 frames, while the macro-tracking mode (MA) has a 10 subframe period. In between A and MA, micro-tracking mode (MI) searches can be performed.

In an example, the length of the periods for repeating A, MA or MI can be predetermined based on empirical observations, such that acceptable performance is maintained for the expected range of channels. Alternatively, the periods can be adapted depending on certain channel metrics such as, for example, correlation and mutual information. Another method to optimize the search mode periods is to track a MI-vs-beam/precoder-index-histogram. A small/high plateau width of the histogram can trigger a short/long acquisition period, respectively.

Example 4. Aperiodic Switching—Beam/Precoder Index Drift

In instances when the UE 102 uses aperiodic switching of the beam index search modes, the UE 102 can measure certain metrics and use the metrics to switch between the different search modes. In one example, the drift of the selected beam/precoder index in acquisition and/or macro-tracking modes can be measured. If the drift exceeds a certain threshold, the UE 102 can switch back to acquisition mode to carry out a global search.

Example 5. Aperiodic Switching—Correlation

In instances when the UE 102 detects a change in channel correlation, a global search or a limited search (acquisition/macro-tracking mode) can be triggered aperiodically. A determination of whether an acquisition or macro-tracking is enabled can depend on the amount of change in the channel correlation.

Example 6. Aperiodic Switching—Mutual Information (MI) Histogram

In an example, the UE 102 can measure the width and the location of the MI peak plateau. In case the plateau width changes or the beam/precoder selected in tracking or micro-tracking modes is located close to a plateau-edge, an acquisition or a macro-tracking is scheduled. In another example, a change of MI above a threshold amount can also trigger acquisition or macro-tracking.

Introducing different beam/precoder search modes for single carrier systems (as discussed in the above examples) can reduce the power consumption and computation complexity averaged over time, but it may not address the peak computation load in acquisition/macro modes. In an example, to reduce the peak complexity for modern chipsets supporting a large number of component carriers (e.g., up to 32 component carriers in LTE Rel-13), the acquisition- and/or macro-tracking-modes can be staggered in the spectral domain. Consequently, the peak complexity over the component carriers can be substantially reduced, thereby allowing for a hardware- and power-efficient implementation. To balance the complexity/performance trade-off, a determination can be made as to how many acquisitions/macro-/micro-modes can be run in parallel. The examples below disclose different methods for staggering acquisition and tracking modes.

Example 7. Staggering in Round-Robin Fashion

In an example, the acquisition/macro-tracking modes can be staggered in a round-robin way over the different carriers. FIG. 7 is a diagram illustrating staggering of three beam/precoder search modes in a multi-carrier signal, in accordance with some exemplary implementations. Referring to FIG. 7, table 700 illustrates that the acquisition (A) and macro-tracking (MA) modes can be distributed in a round-robin fashion to the three configured carriers. In the illustrated example of table 700, it is assumed that at most one acquisition mode plus one macro-tracking mode can be scheduled within the same transmission time interval (TTI).

Example 8. Staggering in Round-Robin Fashion Plus Acquisition Periods

As a variation of Example 7, the UE 102 can use acquisition mode but with a specific (e.g., maximum) periodicity. FIG. 8 is a diagram illustrating staggering of three beam/precoder search modes in a multi-carrier signal with a maximum periodicity of a global search mode, in accordance with some exemplary implementations. Referring to FIG. 8, table 800 illustrates an example, where per carrier acquisition mode is allowed once per 20 subframes. In between two allowed acquisitions for a certain carrier, only the macro- and micro-tracking modes can be used. Distributing the macro- and micro-tracking modes over the configured carriers can be organized in a round-robin fashion, as seen in table 800.

FIG. 9 is a diagram illustrating staggering of three beam/precoder search modes in a multi-carrier signal including a periodic global search mode, in accordance with some exemplary implementations. Referring to FIG. 9, table 900 illustrates an example, where per carrier acquisition mode is allowed once per 20 subframes, and a maximum of two acquisition modes and one macro-tracking mode per TTI. For each carrier, the acquisition period is assumed to be 20 subframe. In between two acquisition TTIs for a given carrier, the MA or MI modes can be allowed, and the single MA mode over all carriers in a given TTI can be distributed in round-robin fashion, as seen in table 900.

Example 9. Staggering Depending on Channel Quality Metrics

Similar to Examples 5 and 6, the channel correlation or the MI histogram statics can be used to organize the staggering of the acquisition and/or tracking beam index search modes. In the case of multiple component carriers, the relative differences of correlation and/or MI histogram can be used to decide which carrier is configured in which mode, i.e. acquisition/tracking/macro-tracking/micro-tracking, etc.

Example 10. Staggering Depending on Previous Beam Selections

Similar to Example 4, the beam/precoder drift over previous measurements can be used as a metric for organizing the staggering of the acquisition modes. In the case of multiple component carriers, absolute drift values can be compared, in addition to relative drift values between the different component carriers. For example, the carriers with high drift values can be configured more often in PMI acquisition mode.

The above examples for staggering the acquisitions rely on a previous beam/precoder index that has been previously computed (and, e.g., stored in memory). However, there are use cases where a plurality of carriers (or at least more than one carrier) are configured and/or activated at the same time and no prior beam index search history is available. The following example aspects can be used to perform beam index searches under such circumstances.

Example 11. Allow all Carriers to go to Acquisition Mode

In an example, all carriers can be allowed to go to acquisition mode to initialize the system at startup or after a certain set of carriers are activated.

Example 12. Share Acquisition Mode Among Carriers

In an example, the acquisition mode can be initialized by carrying out a global search in acquisition mode in one subcarrier and using the selected grid of beams from the performed search for searches in all remaining configured carriers. If the distances between the center frequencies of the different carriers are within a predetermined amount, the selected grid of beams may be used with the other carriers.

Figure 10:
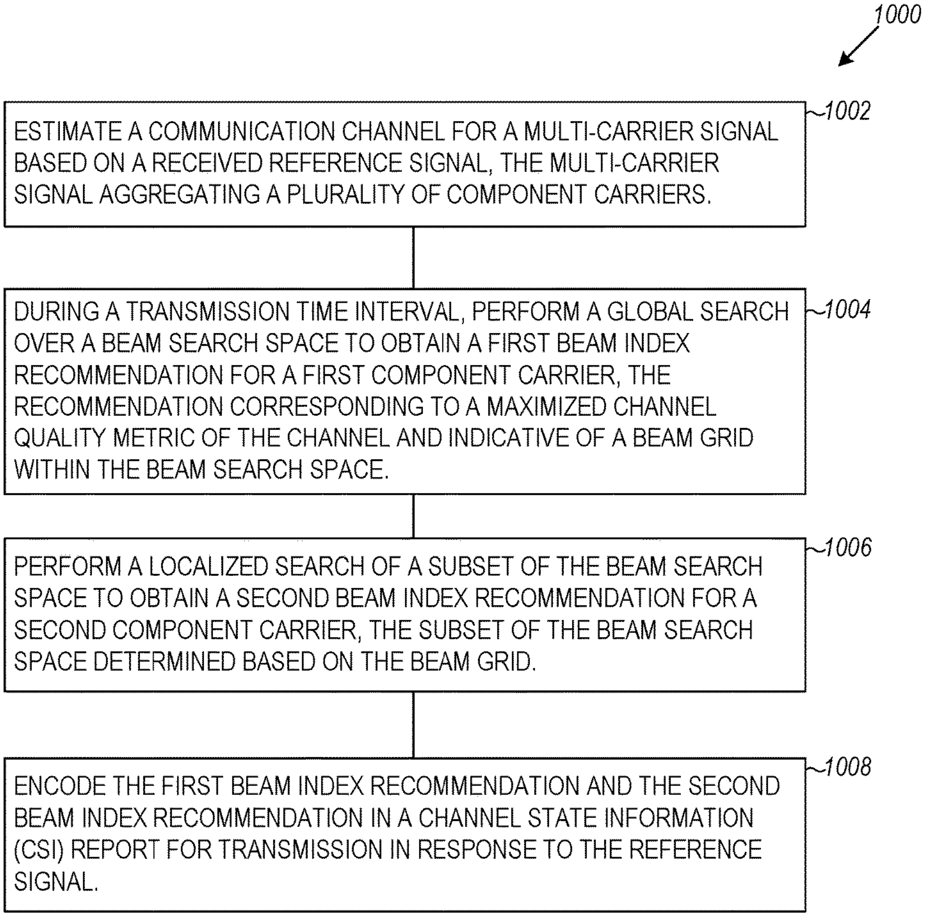
FIG. 10 is a flow diagram illustrating example functionalities for CSI reporting in beamforming systems, in accordance with some exemplary implementations.

FIG. 10 is a flow diagram illustrating example functionalities for CSI reporting in beamforming systems, in accordance with some exemplary implementations. Referring to FIG. 10, the example method 1000 may start at 1002, when a communication channel for a multi-carrier signal can be estimated based on a received reference signal (e.g., CSI-RS 130). The multi-carrier signal can aggregate a plurality of component carriers (e.g., as illustrated in FIGS. 7-9). At 1004, during a transmission time interval of the multi-carrier signal, a global search can be performed over a beam search space to obtain a first beam index recommendation for a first component carrier of the plurality of component carriers. For example, and in reference to FIG. 7, an acquisition search can be performed for CC0 in SF1. The first beam index recommendation can correspond to a maximized channel quality metric of the estimated communication channel and can indicate a beam grid within the beam search space. During the acquisition search, the entire beam search space can be searched and a channel quality metric calculated for each beam hypothesis within the beam search space can be determined. A highest channel quality metric is selected and a beam index corresponding to the highest channel quality metric is selected as the acquisition search result.

At 1006, a localized search of a subset of the beam search space can be performed to obtain a second beam index recommendation for a second component carrier of the plurality of component carriers. The subset of the beam search space can be determined based on the beam grid. For example, the beam index from the acquisition search can be used to determine a subset of the beam search space (e.g., beams in the vicinity of the beam corresponding to the beam index obtained during acquisition). The localized search can be the MA (performed for CC1) or MI (performed for CC2) in subframe 1.

At 1008, the first beam index recommendation and the second beam index recommendation can be encoded in a CSI report (e.g., 131) for transmission in response to the reference signal.

Figure 11:
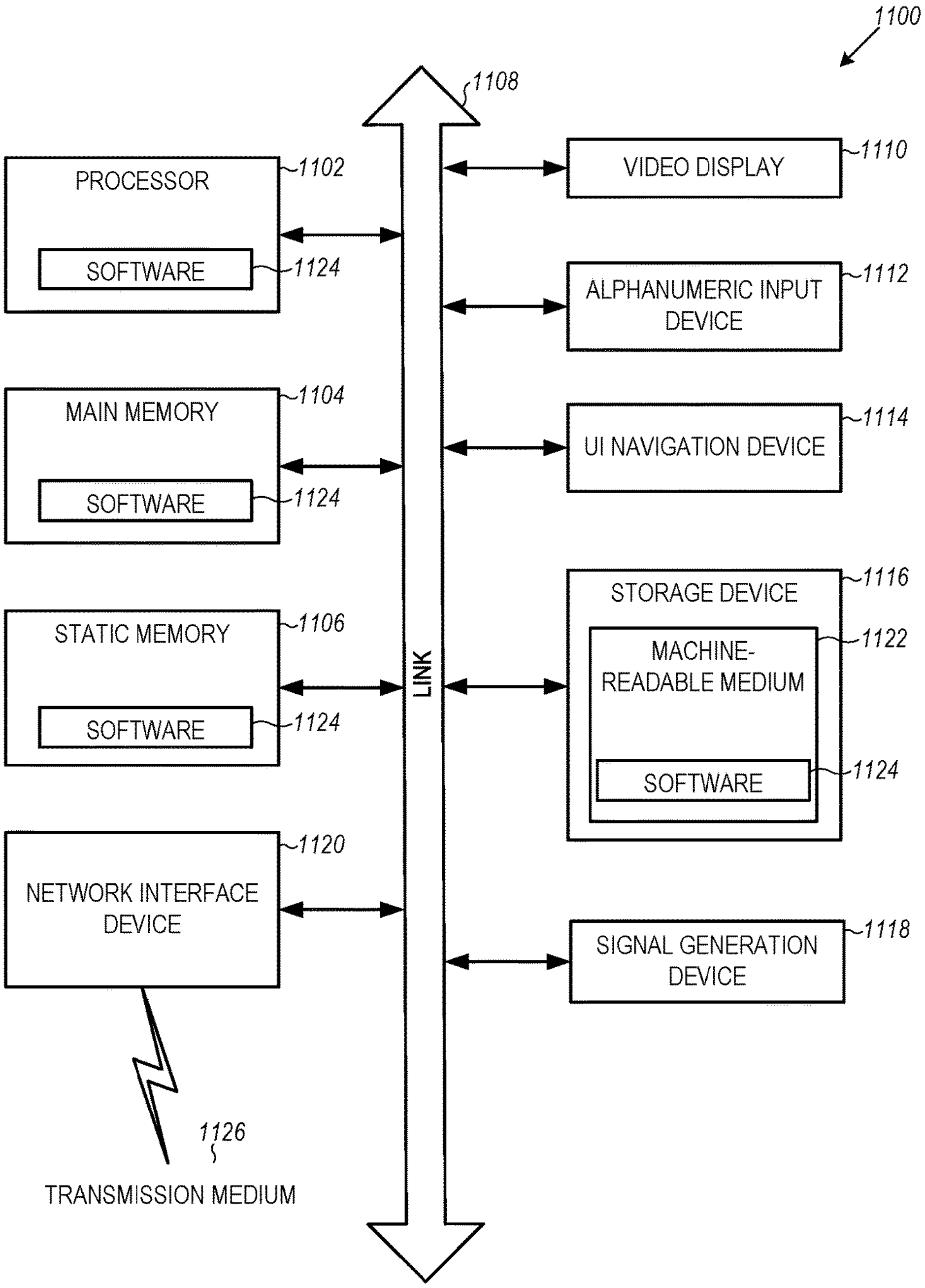
FIG. 11 illustrates a block diagram of a communication device such as an eNB or a UE, in accordance with some exemplary implementations.

FIG. 11 illustrates a block diagram of a communication device such as an eNB or a UE, in accordance with some exemplary implementations. In alternative exemplary implementations, the communication device 1100 may operate as a standalone device or may be connected (e.g., networked) to other communication devices. In a networked deployment, the communication device 1100 may operate in the capacity of a server communication device, a client communication device, or both in server-client network environments. In an example, the communication device 1100 may act as a peer communication device in peer-to-peer (P2P) (or other distributed) network environment. The communication device 1100 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The communication device 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The communication device 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The communication device 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a communication device readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the communication device 1100. In an example, one or any combination of the hardware processor 1102, the main memory 1104, the static memory 1106, or the storage device 1116 may constitute communication device readable media.

While the communication device readable medium 1122 is illustrated as a single medium, the term "communication device readable medium" may include a single medium or multiple media (e.g., a centralized or distributed database, and/or associated caches and servers) configured to store the one or more instructions 1124.

The term "communication device readable medium" may include any medium that is capable of storing, encoding, or carrying instructions for execution by the communication device 1100 and that cause the communication device 1100 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), MIMO, or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the communication device 1100, and includes digital or analog communications signals or other intangible medium to facilitate communication of such software.

Additional Notes and Examples

Example 1 is an apparatus of a user equipment (UE), the apparatus comprising: memory; and processing circuitry, the processing circuitry configured to: estimate a communication channel for a multi-carrier signal based on a received reference signal; during a transmission time interval of the multi-carrier signal: perform a global search over a beam search space to obtain a first beam index recommendation for a first component carrier of a plurality of component carriers, the first beam index recommendation corresponding to a maximized channel quality metric of the channel and indicative of a beam grid within the beam search space; and perform a localized search of a subset of the beam search space to obtain a second beam index recommendation for a second component carrier, the subset determined based on the beam grid; and encode the first and the second beam index recommendations in a channel state information (CSI) report for transmission in response to the reference signal.

In Example 2, the subject matter of Example 1 optionally includes wherein the reference signal is a channel state information reference signal (CSI-RS).

In Example 3, the subject matter of any one or more of Examples 1-2 optionally include wherein the localized search is one of a macro-search or a micro-search of the subset of the beam search space.

In Example 4, the subject matter of Example 3 optionally includes wherein the processing circuitry is further configured to, during the macro-search: perform the localized search for the second beam index recommendation by searching a plurality of beam grids in the vicinity of the beam grid within the subset of the beam search space.

In Example 5, the subject matter of Example 4 optionally includes wherein the processing circuitry is further configured to, during the micro-search: perform the localized search for the second beam index recommendation by searching one or more beams within the beam grid.

In Example 6, the subject matter of Example 5 optionally includes wherein the processing circuitry is further configured to: periodically switch between the macro-search and the micro-search, based on a number of subframes encoded for transmission for the second component carrier.

In Example 7, the subject matter of any one or more of Examples 5-6 optionally include wherein the localized search to obtain the second beam index recommendation is a macro-search, and the processing circuitry is further configured to: perform a micro-search of the subset of the beam search space to obtain a third beam index recommendation for a third component carrier of the plurality of component carriers, wherein the global search, the micro-search and the macro-search are performed simultaneously, within the transmission time interval.

In Example 8, the subject matter of Example 7 optionally includes wherein the processing circuitry is further configured to: during subsequent transmission time intervals: perform the global search, the micro-search and the macro-search in a round-robin scheme over the plurality of component carriers.

In Example 9, the subject matter of any one or more of Examples 1-8 optionally include wherein the processing circuitry is configured to: during subsequent transmission time intervals: periodically perform the global search over the beam search space to obtain an update to the first beam index recommendation for the first component carrier, wherein the global search is repeated after a pre-determined number of subframes.

In Example 10, the subject matter of Example 9 optionally includes wherein the processing circuitry is configured to: perform the localized search to obtain beam index recommendations for the first component carrier, wherein the localized search is periodically performed between subsequent global searches.

In Example 11, the subject matter of any one or more of Examples 1-10 optionally include wherein the processing circuitry is further configured to, during the global search: determine for the first component carrier, a channel quality metric of the communication channel for each of a plurality of beams within the beam search space; and determine the maximized channel quality metric from the plurality of determined channel quality metrics, wherein the first beam index recommendation corresponds to a beam of the plurality of beams, the beam associated with the maximized channel quality metric.

In Example 12, the subject matter of any one or more of Examples 1-11 optionally include wherein the channel quality metric is one of: signal-to-interference-plus-noise ratio (SINR); signal-to-noise ratio (SNR); signal-to-noise plus distortion ratio (SNDR); channel power; channel correlation; and mutual information (MI).

In Example 13, the subject matter of any one or more of Examples 1-12 optionally include wherein the processing circuitry is further configured to: encode the first beam index recommendation and the second beam index recommendation in a precoding matrix indicator (PMI) within the CSI report.

In Example 14, the subject matter of any one or more of Examples 1-13 optionally include transceiver circuitry coupled to the processing circuitry; and one or more antennas coupled to the transceiver circuitry.

Example 15 is an apparatus of a user equipment (UE), the apparatus comprising: memory; and processing circuitry, the processing circuitry configured to: estimate a communication channel for a multi-carrier signal based on a received channel state information reference signal (CSI-RS) or a cell-specific reference signal (CRS), the multi-carrier signal aggregating a plurality of component carriers; during a transmission time interval (TTI) of the multi-carrier signal: perform a plurality of global searches over a beam search space to obtain beam index recommendations for a subset of the plurality of component carriers within the TTI, the beam index recommendations corresponding to maximized channel quality metrics of the estimated communication channel for corresponding carriers of the plurality component carriers; and perform a localized search of a subset of the beam search space to obtain at least another beam index recommendation for another component carrier of the plurality of component carriers, the subset of the beam search space determined based on one or more beams within the beam search space corresponding to the plurality of global searches; and encode the beam index recommendations from the global searches and the localized search in a channel state information (CSI) report for transmission in response to the reference signal.

In Example 16, the subject matter of Example 15 optionally includes wherein to perform the plurality of global searches, the processing circuitry is further configured to: perform a first global search over the beam search space to obtain a first beam index recommendation for a first component carrier of the plurality of component carriers, the first beam index recommendation corresponding to a maximized channel quality metric of the estimated communication channel for the first component carrier; and perform a second global search over the beam search space to obtain a second beam index recommendation for a second component carrier of the plurality of component carriers, the second beam index recommendation corresponding to a maximized channel quality metric of the estimated communication channel for the second component carrier.

In Example 17, the subject matter of Example 16 optionally includes wherein the localized search is one of a macro-search or a micro-search of the subset of the beam search space, and wherein the processing circuitry is further configured to: during the macro-search: perform the localized search for the at least another beam index recommendation by searching a plurality of beam grids in the vicinity of the one or more beams within the beam search space; and during the micro-search: perform the localized search for the at least another beam index recommendation by searching the one or more beams within the beam grid.

In Example 18, the subject matter of Example 17 optionally includes wherein the processing circuitry is further configured to: when performing a macro-search for the at least another beam index recommendation within the TTI: perform a micro-search of the subset of the beam search space to obtain a fourth beam index recommendation for a fourth component carrier of the plurality of component carriers.

In Example 19, the subject matter of Example 18 optionally includes wherein the processing circuitry is further configured to: when performing the macro-search for the at least another beam index recommendation within the TTI: performing the micro-search for the fourth component carrier and for a plurality of remaining component carriers of the plurality of component carriers.

In Example 20, the subject matter of any one or more of Examples 15-19 optionally include wherein the processing circuitry is further configured to: detect a change in one or both of channel correlation or delay spread of the communication channel, the change being higher than a threshold amount; upon detecting the change in the channel correlation or the delay spread, perform a new global search of the beam search space for new beam index recommendations for the first and second component carriers; and encode the new beam index recommendations in the CSI report.

In Example 21, the subject matter of any one or more of Examples 15-20 optionally include wherein the processing circuitry is further configured to: detect a change in a distribution of peak values of a channel quality metric of the communication channel, the change being higher than a threshold amount; upon detecting the change in the distribution of peak values of the channel quality metric, perform a new global search of the beam search space for new beam index recommendations for the first and second component carriers; and encode the new beam index recommendations in the CSI report.

In Example 22, the subject matter of Example 21 optionally includes wherein the channel quality metric is one of: signal-to-interference-plus-noise ratio (SINR); signal-to-noise ratio (SNR); signal-to-noise plus distortion ratio (SNDR); channel power; channel correlation; and mutual information (MI).

Example 23 is a non-transitory computer-readable storage medium that stores instructions for execution by one or more processors, the instructions to configure the one or more processors to cause an apparatus of a user equipment (UE) to: estimate a communication channel for a multi-carrier signal based on a received reference signal, the multi-carrier signal aggregating a plurality of component carriers; retrieve a first beam index recommendation for a first component carrier of the plurality of component carriers, the first beam index recommendation generated during a first global search of a beam space and indicative of a beam grid within the beam space; during a transmission time interval of the multi-carrier signal: perform a second global search over the beam space to obtain a second beam index recommendation for the first component carrier of the plurality of component carriers, the second beam index recommendation corresponding to a maximized channel quality metric of the estimated communication channel; and perform a localized search of a subset of the beam search space to obtain a third beam index recommendation for a second component carrier of the plurality of component carriers, the subset of the beam search space determined based on the beam grid; and encode the second beam index recommendation and the third beam index recommendation in a channel state information (CSI) report for transmission in response to the reference signal.

In Example 24, the subject matter of Example 23 optionally includes wherein the instructions configure the one or more processors to further cause the apparatus to: determine a first beam drift value based on difference between the first beam index recommendation and the second beam index recommendation; determine periodicity for a global search for updated beam index recommendations for the first component carrier based on the first beam drift value; and periodically performing the global search over the beam space for the updated beam index recommendations for the first component carrier at the determined periodicity.

In Example 25, the subject matter of Example 24 optionally includes wherein the instructions configure the one or more processors to further cause the apparatus to: determine a second beam drift value based on difference between the first beam index recommendation and the third beam index recommendation; determine periodicity for a global search for updated beam index recommendations for the second component carrier based on the second beam drift value; and periodically performing the global search over the beam space for the updated beam index recommendations for the second component carrier at the determined periodicity.

In Example 26, the subject matter of any one or more of Examples 23-25 optionally include wherein the instructions configure the one or more processors to further cause the apparatus to: during an initial transmission time interval of the multi-carrier signal: perform a plurality of global searches over the beam space to obtain a plurality of beam index recommendations corresponding to the plurality of component carriers, the plurality of beam index recommendations corresponding to a maximized channel quality metric of the estimated communication channel; and encode the plurality of beam index recommendations in the CSI report for transmission in response to the reference signal.

In Example 27, the subject matter of any one or more of Examples 23-26 optionally include wherein the instructions configure the one or more processors to further cause the apparatus to: during an initial transmission time interval of the multi-carrier signal: perform a global search of the beam space to generate the first beam index recommendation for the first component carrier of the plurality of component carriers, the first beam index recommendation corresponding to a maximized channel quality metric of the estimated communication channel for the first component carrier; generate a plurality of additional beam index recommendations for a remaining plurality of the component carriers, the additional beam index recommendations being equal to the first beam index recommendation; encode the first beam index recommendation and the additional beam index recommendations in the CSI report for transmission in response to the reference signal.

In Example 28, the subject matter of any one or more of Examples 23-27 optionally include wherein the second and third beam index recommendations comprise a precoding matrix for digital phasing of a transmit signal.

The above detailed description includes references to the accompanying drawings, which form a part of the detailed description. The drawings show, by way of illustration, specific exemplary implementations that may be practiced. These exemplary implementations are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

The above description is intended to be illustrative, and not restrictive. For example, the above-described examples (or one or more aspects thereof) may be used in combination with others. Other exemplary implementations may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as exemplary implementations may feature a subset of said features. Further, exemplary implementations may include fewer features than those disclosed in a particular example. Thus, the following claims are hereby incorporated into the Detailed Description, with a claim standing on its own as a separate exemplary implementation. The scope of the exemplary implementations disclosed herein is to be determined with reference to the appended claims, along with the full scope of equivalents to which such claims are entitled.

What is claimed is:

1. An apparatus of a user equipment (UE), the apparatus comprising memory; and processing circuitry, the processing circuitry configured to:

estimate a communication channel for a multi-carrier signal based on a received reference signal;

during a transmission time interval of the multi-carrier signal:

perform a global search over a beam search space including a plurality of beams to obtain a first beam index recommendation for a first component carrier of a plurality of component carriers, the first beam index recommendation corresponding to a maximized channel quality metric of the communication channel and indicative of a beam grid, the beam grid including a group of neighboring beams within the beam search space; and perform a localized search of a subset of the beam search space associated with a subset of the plurality of beams, to obtain a second beam index recommendation for a second component carrier, the subset of the beam search space determined based on the beam grid; and encode the first and the second beam index recommendations in a channel state information (CSI) report for transmission in response to the reference signal.

2. The apparatus of claim 1, wherein the reference signal is a channel state information reference signal (CSI-RS).

3. The apparatus of claim 1, wherein the localized search is one of a macro-search or a micro-search of the subset of the beam search space.

4. The apparatus of claim 3, wherein the processing circuitry is further configured to, during the macro-search:

perform the localized search for the second beam index recommendation by searching a plurality of beam grids in the vicinity of the beam grid within the subset of the beam search space.

5. The apparatus of claim 4, wherein the processing circuitry is further configured to, during the micro-search:

perform the localized search for the second beam index recommendation by searching one or more beams within the beam grid.

6. The apparatus of claim 5, wherein the processing circuitry is further configured to:

periodically switch between the macro-search and the micro-search, based on a number of subframes encoded for transmission for the second component carrier.

7. The apparatus of claim 5, wherein the localized search to obtain the second beam index recommendation is a macro-search, and the processing circuitry is further configured to:

perform a micro-search of the subset of the beam search space to obtain a third beam index recommendation for a third component carrier of the plurality of component carriers, wherein the global search, the micro-search and the macro-search are performed simultaneously, within the transmission time interval.

8. The apparatus of claim 7, wherein the processing circuitry is further configured to:

during subsequent transmission time intervals:

perform the global search, the micro-search and the macro-search in a round-robin scheme over the plurality of component carriers.

9. The apparatus of claim 1, wherein the processing circuitry is configured to:

during subsequent transmission time intervals:

periodically perform the global search over the beam search space to obtain an update to the first beam index recommendation for the first component carrier, wherein the global search is repeated after a predetermined number of subframes.

10. The apparatus of claim 9, wherein the processing circuitry is configured to:

perform the localized search to obtain beam index recommendations for the first component carrier, wherein the localized search is periodically performed between subsequent global searches.

11. The apparatus of claim 1, wherein the processing circuitry is further configured to, during the global search:

determine for the first component carrier, a channel quality metric of the communication channel for each of a plurality of beams within the beam search space; and determine the maximized channel quality metric from the plurality of determined channel quality metrics, wherein the first beam index recommendation corresponds to a beam of the plurality of beams, the beam associated with the maximized channel quality metric.

12. The apparatus of claim 1, wherein the channel quality metric is one of:

signal-to-interference-plus-noise ratio (SINR);

signal-to-noise ratio (SNR);

signal-to-noise plus distortion ratio (SNDR);

channel power;

channel correlation; and mutual information (MI).

13. An apparatus of a user equipment (UE), the apparatus comprising memory; and processing circuitry, the processing circuitry configured to:

estimate a communication channel for a multi-carrier signal based on a received channel state information reference signal (CSI-RS) or a cell-specific reference signal (CRS), the multi-carrier signal aggregating a plurality of component carriers;

during a transmission time interval (TTI) of the multi-carrier signal:

perform a plurality of global searches over a beam search space to obtain beam index recommendations for a subset of the plurality of component carriers within the TTI, the beam index recommendations corresponding to maximized channel quality metrics of the estimated communication channel for corresponding carriers of the plurality component carriers; and perform a localized search of a subset of the beam search space to obtain at least another beam index recommendation for another component carrier of the plurality of component carriers, the another component carrier being different from the subset of component carriers, and the subset of the beam search space determined based on one or more beams within the beam search space corresponding to the plurality of global searches; and encode the beam index recommendations from the global searches and the localized search in a channel state information (CSI) report for transmission in response to the reference signal.

14. The apparatus of claim 13, wherein to perform the plurality of global searches, the processing circuitry is further configured to:

perform a first global search over the beam search space to obtain a first beam index recommendation for a first component carrier of the plurality of component carriers, the first beam index recommendation corresponding to a maximized channel quality metric of the estimated communication channel for the first component carrier; and perform a second global search over the beam search space to obtain a second beam index recommendation for a second component carrier of the plurality of component carriers, the second beam index recommendation corresponding to a maximized channel quality metric of the estimated communication channel for the second component carrier.

15. The apparatus of claim 14, wherein the localized search is one of a macro-search or a micro-search of the subset of the beam search space, and wherein the processing circuitry is further configured to:

during the macro-search:

perform the localized search for the at least another beam index recommendation by searching a plurality of beam grids in the vicinity of the one or more beams within the beam search space; and during the micro-search:

perform the localized search for the at least another beam index recommendation by searching the one or more beams within the beam grid.

16. The apparatus of claim 15, wherein the processing circuitry is further configured to:

when performing a macro-search for the at least another beam index recommendation within the TTI:

perform a micro-search of the subset of the beam search space to obtain a fourth beam index recommendation for a fourth component carrier of the plurality of component carriers.

17. The apparatus of claim 16, wherein the processing circuitry is further configured to:

when performing the macro-search for the at least another beam index recommendation within the TTI:

performing the micro-search for the fourth component carrier and for a plurality of remaining component carriers of the plurality of component carriers.

18. The apparatus of claim 13, wherein the processing circuitry is further configured to:

detect a change in one or both of channel correlation or delay spread of the communication channel, the change being higher than a threshold amount;

upon detecting the change in the channel correlation or the delay spread, perform a new global search of the beam search space for new beam index recommendations for the first and second component carriers; and encode the new beam index recommendations in the CSI report.

19. The apparatus of claim 13, wherein the processing circuitry is further configured to:

detect a change in a distribution of peak values of a channel quality metric of the communication channel, the change being higher than a threshold amount;

upon detecting the change in the distribution of peak values of the channel quality metric, perform a new global search of the beam search space for new beam index recommendations for the first and second component carriers; and encode the new beam index recommendations in the CSI report.

20. The apparatus of claim 19, wherein the channel quality metric is one of:

signal-to-interference-plus-noise ratio (SINR);

signal-to-noise ratio (SNR);

signal-to-noise plus distortion ratio (SNDR);

channel power;

channel correlation; and mutual information (MI).

21. A non-transitory computer-readable storage medium that stores instructions for execution by one or more processors, the instructions to configure the one or more processors to cause an apparatus of a user equipment (UE) to:

estimate a communication channel for a multi-carrier signal based on a received reference signal, the multi-carrier signal aggregating a plurality of component carriers;

retrieve a first beam index recommendation for a first component carrier of the plurality of component carriers, the first beam index recommendation generated during a first global search of a beam space and indicative of a beam grid, the beam grid including a group of neighboring beams within the beam space;

during a transmission time interval of the multi-carrier signal:

perform a second global search over the beam space to obtain a second beam index recommendation for the first component carrier of the plurality of component carriers, the second beam index recommendation corresponding to a maximized channel quality metric of the estimated communication channel; and perform a localized search of a subset of the beam search space to obtain a third beam index recommendation for a second component carrier of the plurality of component carriers, the subset of the beam search space determined based on the beam grid; and encode the second beam index recommendation and the third beam index recommendation in a channel state information (CSI) report for transmission in response to the reference signal.

22. The non-transitory computer-readable storage medium of claim 21, wherein the instructions configure the one or more processors to further cause the apparatus to:

determine a first beam drift value based on difference between the first beam index recommendation and the second beam index recommendation;

determine periodicity for a global search for updated beam index recommendations for the first component carrier based on the first beam drift value; and periodically performing the global search over the beam space for the updated beam index recommendations for the first component carrier at the determined periodicity.

23. The non-transitory computer-readable storage medium of claim 22, wherein the instructions configure the one or more processors to further cause the apparatus to:

determine a second beam drift value based on difference between the first beam index recommendation and the third beam index recommendation;

determine periodicity for a global search for updated beam index recommendations for the second component carrier based on the second beam drift value; and periodically performing the global search over the beam space for the updated beam index recommendations for the second component carrier at the determined periodicity.

24. The non-transitory computer-readable storage medium of claim 21, wherein the instructions configure the one or more processors to further cause the apparatus to:

during an initial transmission time interval of the multi-carrier signal:

perform a plurality of global searches over the beam space to obtain a plurality of beam index recommendations corresponding to the plurality of component carriers, the plurality of beam index recommendations corresponding to a maximized channel quality metric of the estimated communication channel; and encode the plurality of beam index recommendations in the CSI report for transmission in response to the reference signal.

25. The non-transitory computer-readable storage medium of claim 21, wherein the instructions configure the one or more processors to further cause the apparatus to:

during an initial transmission time interval of the multi-carrier signal:

perform a global search of the beam space to generate the first beam index recommendation for the first component carrier of the plurality of component carriers, the first beam index recommendation corresponding to a maximized channel quality metric of the estimated communication channel for the first component carrier;

generate a plurality of additional beam index recommendations for a remaining plurality of the component carriers, the additional beam index recommendations being equal to the first beam index recommendation; and encode the first beam index recommendation and the additional beam index recommendations in the CSI report for transmission in response to the reference signal.

* * * * *

UNITED STATES PATENT AND TRADEMARK OFFICE

CERTIFICATE OF CORRECTION

PATENT NO. : 10,164,699 B2
APPLICATION NO. : 15/392302
DATED : December 25, 2018
INVENTOR(S) : Franz et al.

It is certified that error appears in the above-identified patent and that said Letters Patent is hereby corrected as shown below:

In the Claims

In Column 27, Line 51, in Claim 1, after "comprising", insert --:--

In Column 29, Line 15, in Claim 13, after "comprising", insert --:--

Signed and Sealed this
Fourteenth Day of April, 2020

Andrei Iancu
*Director of the United States Patent and Trademark Office*